United States Patent [19]

Tezuka

[11] 4,300,504
[45] Nov. 17, 1981

[54] INTERNAL COMBUSTION ENGINE

[75] Inventor: Etsuhiro Tezuka, Hamatsu, Japan

[73] Assignee: Yamaha Hatsudoki Kabushiki Kaisha, Iwata, Japan

[21] Appl. No.: 64,832

[22] Filed: Aug. 8, 1979

[30] Foreign Application Priority Data

Aug. 10, 1978 [JP] Japan .................................. 53-96729

[51] Int. Cl.³ ........................................... F02M 35/10
[52] U.S. Cl. .................... 123/432; 123/52 M; 123/442
[58] Field of Search ............... 123/30 C, 75 B, 52 M, 123/41.31, 122 R, 127, 188 M; 261/65, DIG. 81

[56] References Cited

U.S. PATENT DOCUMENTS

| 2,072,862 | 3/1937 | Balfe | 123/122 R X |
| 2,804,862 | 9/1957 | Nedwidek | 123/188 M |
| 3,456,634 | 7/1969 | Nelson | 261/65 X |
| 3,512,508 | 5/1970 | Winkler | 123/127 X |
| 4,194,474 | 3/1980 | Endo | 123/127 X |

FOREIGN PATENT DOCUMENTS 885583 12/1961 United Kingdom ............ 123/52 M

Primary Examiner—Tony M. Argenbright
Attorney, Agent, or Firm—Ernest A. Beutler

[57] ABSTRACT

Several embodiments of an induction system for internal combustion engines that improve volumetric efficiency and combustion efficiency throughout the engine speed and load ranges. In each embodiment, each chamber of the engine is provided with two intake valves and a spark plug that is symmetrically dispositioned in the chamber. The induction system includes auxiliary induction passages through which the major portion of the engine idle and low speed charge requirements are supplied. The auxiliary induction system is oriented so that the charge will be induced into the chambers at a high velocity and in a flow pattern so that the charge passes the spark plug at the time of ignition. In accordance with a further feature of the invention, a throttle valve is provided in the induction system, which throttle valve is rotatably supported in an insert that is interposed between the charge forming device and the engine chambers for controlling this flow.

6 Claims, 6 Drawing Figures

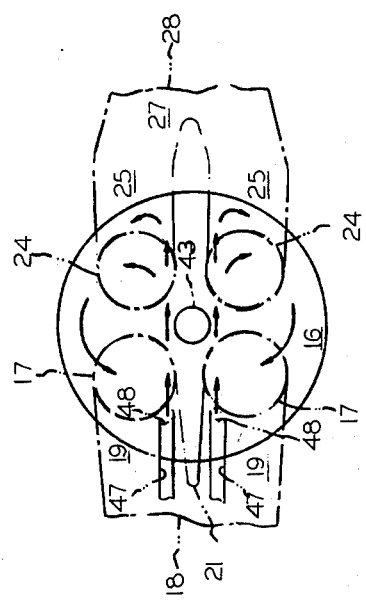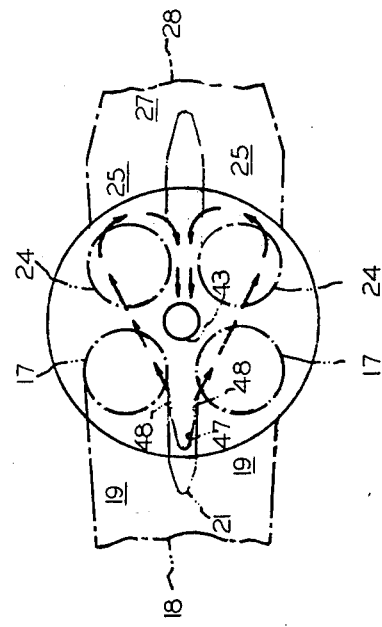

INTERNAL COMBUSTION ENGINE

BACKGROUND OF THE INVENTION

This invention relates to an internal combustion engine and more particularly to an improved induction system for an internal combustion engine.

For a number of years it has been recognized that the volumetric efficiency of an engine can be improved by using multiple intake valves for a given engine chamber. The use of such multiple valves permits a high effective cross sectional area for the induction system without abnormally high inertia loadings. That is, the use of two intake valves permits better volumetric efficiency and higher engine speeds than would be possible with a single induction system and single valve of corresponding cross-sectional area. With an engine embodying two intake valves, it is necessary to position the spark plug centrally of the combustion chamber. With arrangements of the type heretofore proposed, this spark plug location coupled with the direction of intake charge flow may not be satisfactory to provide good combustion at all engine speeds and loads.

More specifically, it is readily acknowledged that low speed performance of engines having a relatively large induction system is poor due to the sluggish air flow into the chamber at low speeds and the relatively low air flow into the chamber at the time of ignition. Although such devices as squish zones may be employed to improve turbulence, the use of large squish areas adversely affects the control over the emission on unwanted exhaust gas constituents. Furthermore, such an arrangement is not completely satisfactory in combination with a centrally positioned spark plug.

It is, therefore, a principal object of this invention to provide an inproved induction system for an internal combustion engine.

It is another object of this invention to provide an induction system for a dual intake valve equipped engine in which turbulence at low speeds is promoted.

It is a yet further object of the invention to provide an induction system for an internal combustion engine that promotes high volumetric efficiency and yet which provides for controlled flow in the combustion chamber at the time of ignition.

With the increased complexity of internal combustion engines, particularly those embodying the ancillary equipment required to provide good efficiency and exhaust emission control, the spacial requirements of the engine have become extremely critical. The positioning of such components as the throttle valves, particularly with engines embodying a multiple throttle valve in an induction tract is one problem that presents itself to an engine designer.

It is therefore, a further object of this invention to provide an improved, compact throttle valve arrangement for an internal combustion engine.

SUMMARY OF THE INVENTION

A first feature of this invention is embodied in an internal combustion engine having a variable volume chamber in which combustion occurs, a spark plug for firing a charge in the chamber and a pair of main intake passages each communicating with the chamber through a respective main intake port for delivering a charge thereto. In accordance with this feature of the invention, a pair of auxiliary induction passages are provided each of which communicates with the chamber through a respective auxiliary intake port. Each auxiliary intake passage has an effective cross-sectional area substantially less than the effective cross-sectional area of each main intake passage for causing a given mass flow of charge through the auxiliary intake ports to enter the chamber at a significantly greater velocity. The auxiliary intake ports are oriented relative to the chamber and to the spark plug for directing the charge entering the chamber through the auxiliary intake ports in a flow path that passes across the spark plug at the time of ignition.

Another feature of this invention is adapted to be embodied in an induction system for an internal combustion engine that comprises a main housing which defines at least in part a variable volume chamber in which combustion occurs. A charge forming device is also provided for forming a charge for the chamber. In connection with this feature of the invention, a spacer formed of a heat insulating material is interposed between the charge forming device and the main housing and defines at least a portion of an induction passage of the induction system. A throttle valve is rotatably supported in the spacer for controlling the flow through the induction passages.

BRIEF DESCRIPTION OF THE DRAWINGS

FIG. 4 is a schematic view, similar in part to FIG. 3, showing another embodiment of the invention.

FIG. 5 is a schematic view, similar in part to FIGS. 3 and 4, showing a still further embodiment of the invention.

DETAILED DESCRIPTION OF THE PREFERRED EMBODIMENTS

Figure 1:
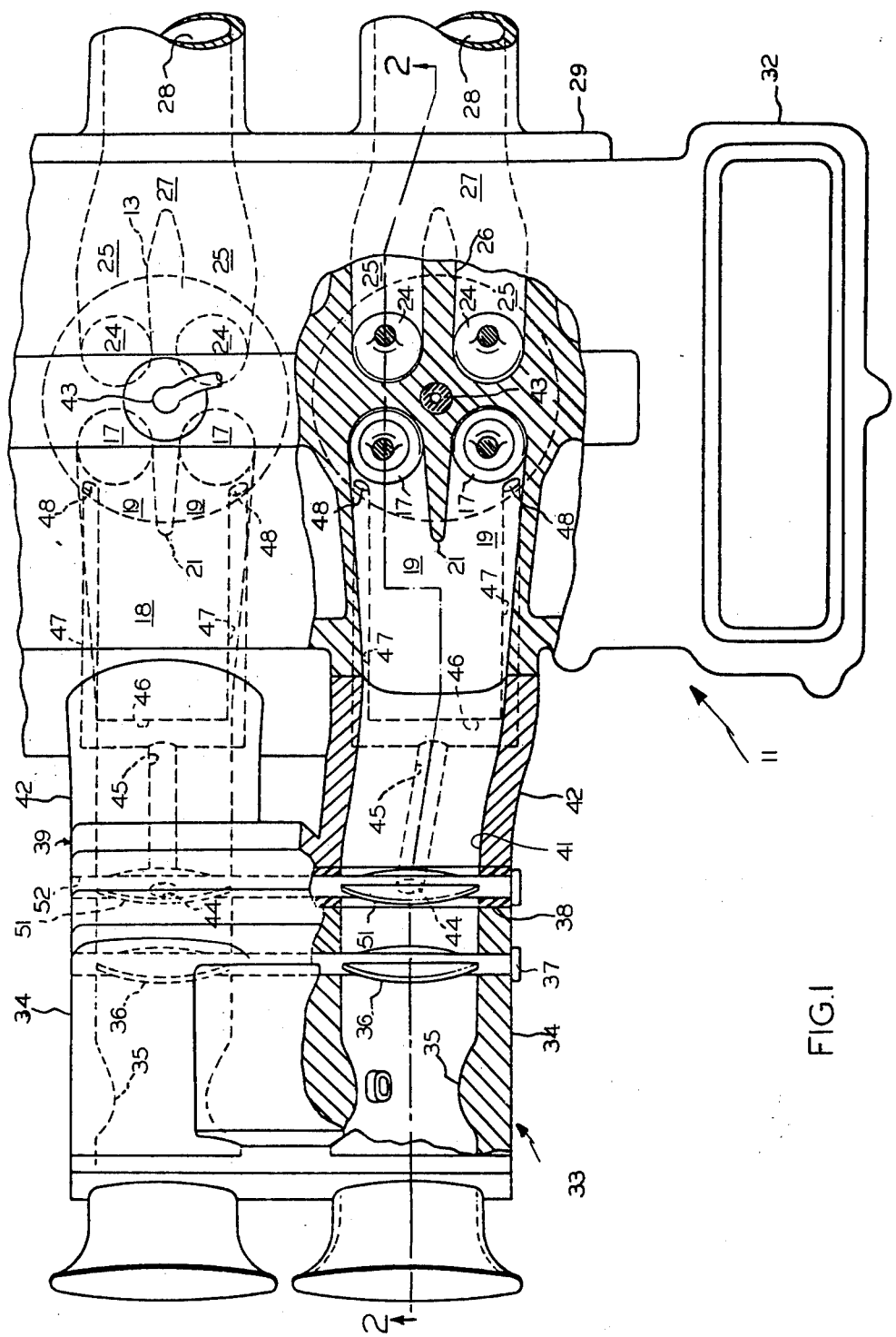
FIG. 1 is a partial top plan view, with portions broken away of an internal combustion engine incorporating a first embodiment of the invention.
Figure 2:
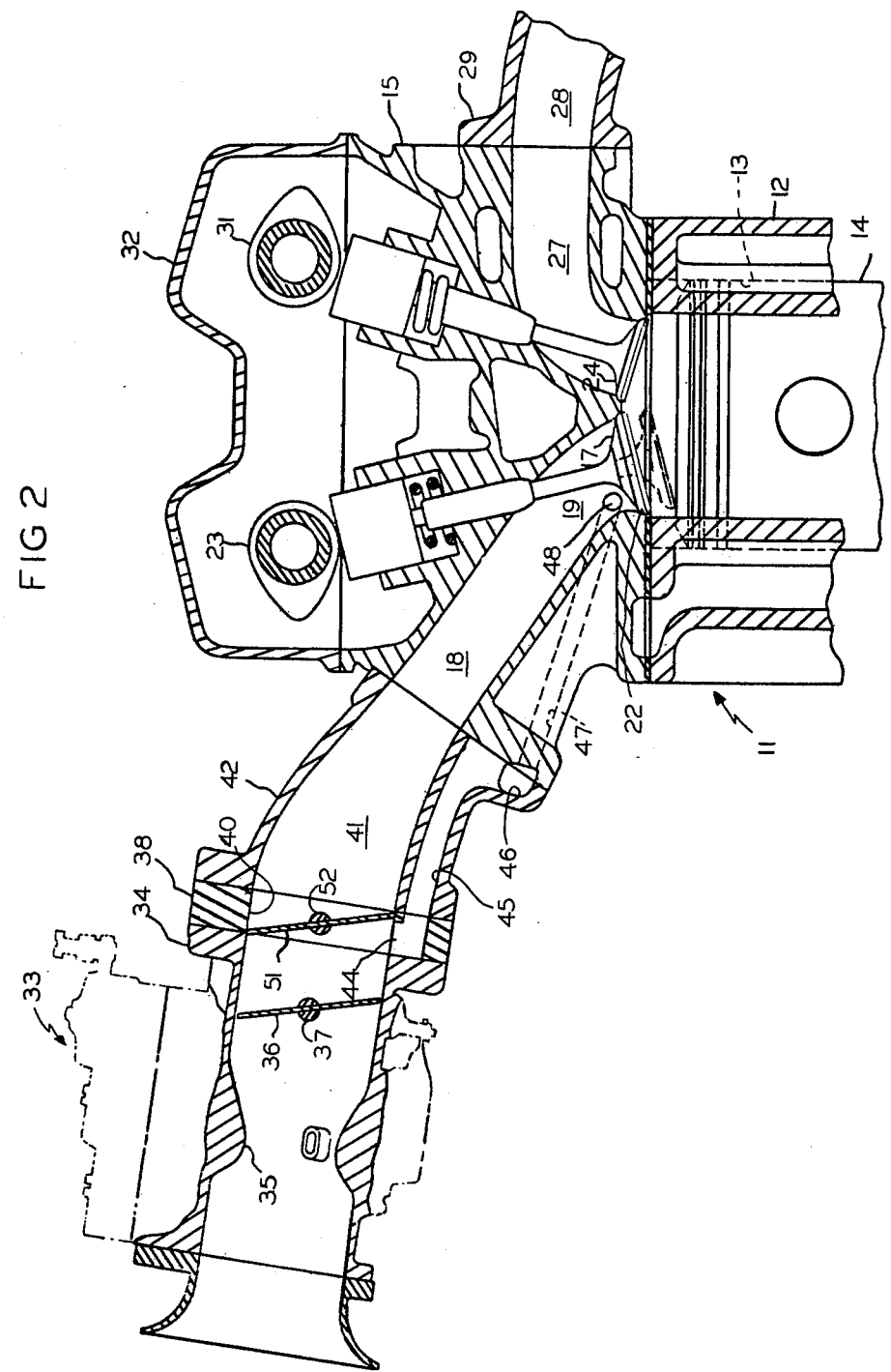
FIG. 2 is a cross-sectional view taken along the line 2—2 of FIG. 1.

Referring first to the embodiment of FIGS. 1 and 2, an internal combustion engine embodying this invention is identified generally by the reference numeral 11. In the depicted embodiment, the engine 11 is of the four cylinder, reciprocating, in-line type. It is to be understood that certain aspects of this invention, as will become apparent to those skilled in the art, may be used with other than reciprocating engines and also that certain features of the invention may be used with engines having other cylinder numbers and configurations. Such modifications are believed to be well within the scope of those skilled in the art and for this reason will not be described.

The engine 11 includes a cylinder block 12 having cylinder bores 13 in which pistons 14 are supported for reciprocation in any known manner. The pistons 14 are connected by means of connecting rods (not shown) to a crankshaft.

A cylinder head 15 is affixed to the cylinder block 12 and has chambers which cooperate with the cylinder bores 13 and pistons 14 to define chambers of variable volume in which combustion occurs. Through this specification, these chambers will be referred to as combustion chambers and they have been indicated in the drawings by the reference numeral 16.

In order to improve high speed volumetric efficiency, the chambers 16 are each provided with a pair of intake valves 17 that control the flow to the chambers 16 from main cylinder head intake passages 18. The passages 18 have a common opening in the inlet side of the cylinder head and branch to separate passage 19 which feed each of the valves 17. The passages 19 are divided by a wall 21 of the cylinder 15 which wall is symmetrically disposed relative to the cylinder bore 13 and chamber 16. The intake valves 17, as have been noted, controls the communication of the passages 19 with the chambers 16. Main intake ports 22 are formed at the chamber end of each passage 19. The valves 17 are operated in any known manner, as by means of an overhead mounted camshaft 23.

In the side of the cylinder head 15 opposite the intake valve 17, a pair of exhaust valves 24 is provided for each chamber 16. The exhaust valves 24 control the flow of exhaust gases from the chambers 16 to branch passages 25. The branch passages 25 are separated, as were the inlet branch passages 19, by a cylinder head wall 26. The wall 26 is also symmetric with the cylinder bore 13 and chamber 16. The passages 25 terminate in common passages 27 each of which discharge into a respective exhaust manifold passage 28 formed by an exhaust manifold 29 that is affixed to the cylinder head 15 in any known manner. An exhaust camshaft 31 is mounted above the cylinder head 15 for actuating the exhaust valves 24.

The intake and exhaust camshafts 23 and 31 are driven in any known manner. The area above the cylinder head 15 in which the camshafts 23 and 31 are contained is closed by a cam cover 32 that is affixed in any known manner to the cylinder head 15.

A charge is delivered to the chamber 16 from a pair of dual barrel carburetors, indicated generally by the reference numeral 33 (only one of which appears in the drawings). The carburetors 33 each have a pair of barrel portions 34 each of which forms a main intake passage having a venturi section 35. Fuel discharge circuits are associated with the carburetors 33 and since the discharge circuits are conventional, they have not been illustrated and will not be described.

A manually operated throttle valve 36 is positioned in each carburetor barrel downstream of the venturi section 35 for controlling the flow through the respective carburetor barrel 35. The throttle valves 36 are affixed to a common throttle shaft 37 that is operated in any known manner as by means of an appropriate operator controlled throttle linkage (not shown).

A plate 38 of heat insulating material is positioned between each carburetor 33 and an intake manifold, indicated generally by the reference numeral 39. The plates 38 have cylindrical bores 40 formed therein which register with and provide communication between the carburetor barrels 34 and runners 41 formed in branches 42 of the manifold 39. The manifold 39 is affixed to the cylinder head 15 in any known manner and the downstream end of the passages 41 communicates with the inlet tracts of the main intake passages 18.

The portion of the construction thus far described is generally conventional with high output engines. By using pairs of intake valves 17 for each of the chambers 16 volumetric efficiency and maximum power are increased over single valve arrangements without sacrificing reciprocating weight of the valve train. However, the described arrangement requires spark plugs 43 to be positioned in each of the chambers 16 with a relatively central location. That is, the spark plugs 43 are positioned generally on the line of symmetry of the engine chambers 16 and cylinder bores 13. Because of this central location and the provision of the dividing walls 21 of the cylinder head by the intake passages 19, the flow of intake charge is actually directed away from the spark plugs 43.

It should be readily apparent that a stoichiometric charge must be present in the vicinity of the gap of the spark plugs 43 at the time of firing in order to insure combustion. This problem is particularly aggravated with low engine speeds when the charge entering the chambers 16 through the relatively large main intake passages 19 is flowing at an extremely low velocity. As a result of this with conventional engines, extremely poor low speed running may be encountered with resulting poor fuel economy and high unwanted exhaust gas emission constituents.

In accordance with the invention, the engine 11 is provided with a relatively small crosssectional induction system which will cause the charge to be drawn into the chambers 16 at a high velocity at idle and low speeds. As will also become apparent, the orientation of the discharge of the auxiliary induction system is such that a flow pattern will be set up in the chambers 16 in a direction to insure the existence of a stoichiometric charge in the vicinity of the spark plug gap at the time of ignition.

The auxiliary induction system for each chamber 16 includes an inlet opening 44 in the spacer 38 in communication with the bore 40. The inlet 44 communicates with a passage 45 that is formed in the manifold branches 42 and which terminates at a transversely extending passage 48 which interconnects each passage 45 with a pair of cylinder head auxiliary intake passages 47. The passages 47 each terminate in auxiliary intake ports 48 that are formed in the cylinder head 15 at a point in the main intake passages 19 closely adjacent the heads of the valve 17, when the valves are closed. The auxiliary intake passages 47 and ports 48 are disposed in such a way, as will become described, so as to generate the desired flow pattern in the chamber 16. In addition, the effective cross-sectional area of the described auxiliary induction system is substantially less than that of the main induction system so that a given mass flow of charge delivered to the chamber 16 through the auxiliary induction system will flow at a substantially greater velocity. The charge flowing at this velocity enters the chamber 16 through the open valves 17 and because of the close proximity of the ports 48 to the chambers 16 the charge enters the chambers at substantially undiminished velocity.

A throttle valve arrangement is incorporated so that a substantial portion of the engine charge requirements at idle and low speed are delivered to the chamber 16 through this auxiliary induction system. As the speed and/or load on the engine increases, an increasing proportion of the charge is supplied to the chambers through the main induction system. In this way, turbulence and improved combustion at lower speeds result without a sacrifice in volumetric efficiency and maximum power output. The throttle valve arrangement includes a control valve of the butterfly type 51 that is positioned in each spacer passage 49. The control valves 51 are supported upon control valve shaft 52 and are operated by means of a suitable vacuum or linkage type actuator which will effect opening of the control valves 51 in a delayed relationship to the opening of the carburetor throttle valves 36. That is, at low and medium openings of the carburetor throttle valves 36, the control valves 51 will be maintained in a closed position. Thus, the intake charge from the carburetors 33 will be delivered to the chambers 16 through the auxiliary induction system. As the carburetor throttle valves 36 are progressively opened, the control valves 51 are opened at an increasing rate so that a larger proportion of the flow to the chambers 16 will take place through the main induction system. The mechanism for operating the control valves 51 has not been illustrated. It is to be understood that this mechanism may be either of the automatic or linkage type or a combination of these types as aforenoted. Reference may be made to the co-pending patent application of Hiromitsu Matsumoto, entitled "Control of Carburetor Supplied Induction System", Ser. No. 838,353, filed Sept. 30, 1977 for examples of automatic vacuum actuator or linkage type actuators for achieving these results. It is to be understood, of course, that other types of arrangements may be employed for achieving the sequential operation of the control valves 51 and throttle valves 36.

Figure 3:
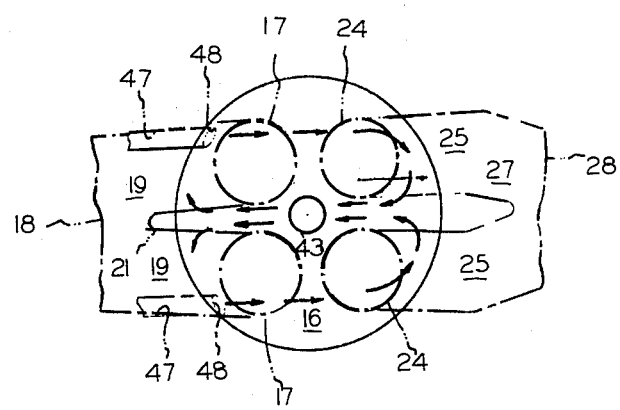
FIG. 3 is a partially schematic view of the engine shown in FIGS. 1 and 2 and depicts the path of charge flow in a combustion chamber of the engine.

The flow pattern in the chambers 16 may be best understood by reference to schematic view of FIG. 3. In this figure the flow pattern of the induction charge from the auxiliary induction system is illustrated by the solid line arrows. It will be noted that the inlet charges pass from the auxiliary intake ports 48 past the open intake valve 17 into the chamber 16 in lines of symmetry about the spark plug 43. The charge impinges on the opposite chamber wall and is redirected along the center line of the chamber back across the gap of the spark plug 43. Thus, the high turbulence gases entering from the auxiliary intake system will be directed past the gap of the spark plug 43 at the time of ignition. Extremely good combustion through the engine load and speed ranges will result.

It is to be understood that flow arrangement provided for by the embodiment of FIGS. 1 through 3 is only exemplary of one variation possible. Other changes may be made without departing from the spirit of the invention and two other possibilities are shown in schematic FIGS. 4 and 5. For instance, the auxiliary induction system may be disposed closely adjacent the dividing wall 21 of the cylinder head main intake passages 19 as shown in FIG. 4. In this embodiment, the cylinder head auxiliary intake passages 47 are disposed closely adjacent the dividing wall 21 as are the auxiliary intake ports 48. Thus, the charge will enter the chamber 16 as shown in the solid line arrows closely adjacent the centerline of the chamber 16 on opposite sides of the spark plug 43. The overlap in flow will insure that the mixture will be adjacent the spark plug gap at the time of ignition. The charge is redirected by the opposite chamber walls back in a somewhat circular fashion on opposite sides of the line of symmetry so that a vortex flow will be experienced in the chamber 16.

FIG. 5 shows still a further variation in this embodiment. The auxiliary induction system passages 47 diverge from the dividing wall 21 and the ports 48 are directed to discharge their flow at approximately a 30 degree angle to the line of symmetry. The flow, as shown by the solid arrows, will impinge upon the opposite chamber walls and be redirected along the line of symmetry across the gap of the spark plug 43 at the time of ignition.

Figure 6:
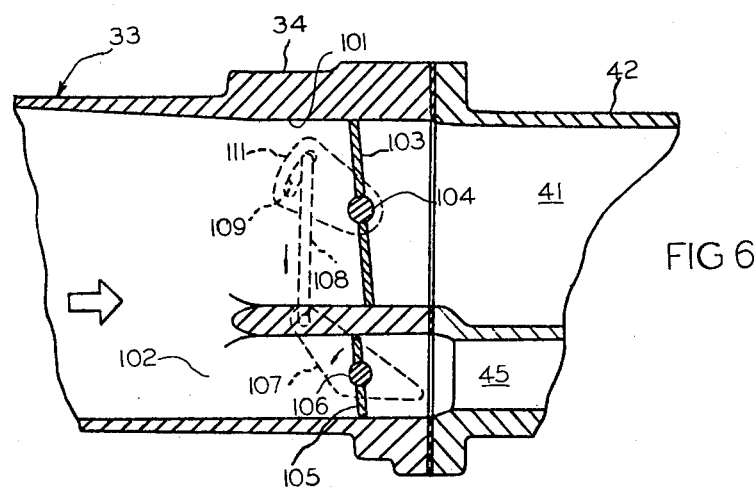
FIG. 6 is a cross-sectional view, similar in part to FIG. 2, showing a throttle valve arrangement useable with a still further embodiment of the invention.

In the embodiments thus far described, the auxiliary intake passages communicate with the main intake passage and a control valve in the main intake passage shunts the flow to the auxiliary induction system. It is to be understood that the invention may also be employed in a construction wherein valves are positioned directly in the auxiliary induction system. Such an arrangement is shown in the embodiment of FIG. 6. In this embodiment the control valve arrangement and throttle valve has only been shown and the adjacent portions of the carburetor 33 and intake manifold 42. It is believed that the application of this principal to the remainder of the engine should be readily apparent to those skilled in the art, particularly in view of the foregoing description.

In connection with this embodiment, the carburetor barrel 34 has a main induction passage 101 and an auxiliary induction passage 102 that are disposed in parallel flow relationship. The main induction passage 101 communicates with the main intake manifold induction passage 41. The auxiliary induction passage 102, on the other hand, communicates with an auxiliary induction passage 45 of the manifold branches 42.

An automatically positioned control valve 103 is supported in the main induction passage 101 upon a control valve shaft 104. The shaft 104 and control valve 103 are operated automatically by means of a linkage or other suitable automatic actuator as aforedescribed. A throttle valve 105 is positioned in the auxiliary induction passage 102 and is rotatably supported on a shaft 106. As with the previously described embodiment, the throttle valves 105 are operated manually be means of a linkage or other system (not shown). The interconnection between the throttle valves 105 and the control valves 103 is such, as with the previously described embodiments, that the idle and low speed requirements are supplied through the auxiliary induction system. As the load on the engine increases, an increasing proportion of the charge will be supplied through the main induction system. This interrelationship between the throttle valve 105 and control valves 103 may be done either by linkage, by means of a vacuum actuator, or by means of a combination of the two.

In connection with this embodiment, a mechanical linkage for achieving this result is shown. This mechanical linkage includes a bellcrank 107 that is affixed to the throttle valve shaft 106 and which is operated manually, as aforedescribed, to position the throttle valves 105. A link 108 is pivotly to one arm of the bellcrank 107 and has an offset end that is received in a slot 109 of a lever 111 that is affixed for rotation with the control valve shaft 104. Thus, a lost motion connection is provided between the throttle valve 105 and the control valves 103.

During initial rotation of the control valve 105, the end of the link 108 will traverse the slot 109 and there will be no opening of the control valves 103. Upon continued rotation, however, the link 111 will be rotated and the control valves 103 will be progressively opened. Thus, the aforedescribed flow relationship between the main and auxiliary induction system will be achieved.

It should be readily apparent that the described embodiments of the invention are effective to promote rapid flame propagation at low speeds and to insure that a stoichiometric mixture having a high degree of turbulence will be present in the vicinity of the spark plug at the time of ignition. Furthermore, the arrangement is such that volumetric efficiency at maximum power is not reduced. Also, the arrangement in one described embodiment is such that the control valves are conveniently positioned in the insulated spacer which is normally positioned between the carburetor and the intake manifold. Thus, the spacial requirements of the use of an additional valve are substantially minimized. Various modifications have been described in the foregoing specification. It is to be understood that various other changes and modifications may be made without departing from the spirit and scope of the invention as described by the appended claims.

What is claimed is:

1. In an internal combustion engine having a variable volume chamber in which combustion occurs, a spark plug for firing a charge in said chamber, a pair of main intake ports and a pair of main intake passages each communicating with said chamber through a respective of said main intake ports for delivering a charge therethrough, the improvement comprising a pair of auxiliary intake ports and a pair of auxiliary intake passages each communicating with said chamber through a respective of said auxiliary ports, said auxiliary intake passages having an effective cross-sectional area substantially less than the effective cross-sectional area of said main intake passages for causing a given mass flow of charge through said auxiliary intake ports to enter said chamber at a significantly greater velocity, said auxiliary intake ports being oriented relative to said chamber and said spark plug for directing the charge entering said chamber through said auxiliary intake ports in a flow path that passes across said spark plug at the time of ignition, valve means for controlling the ratio of communication of said passages with the chamber, and actuating means for operating said valve means so that a substantial portion of the idle and low load requirements for the chamber are delivered through said auxiliary intake passages and a substantial portion of the high load charge requirements are supplied through said main intake passages.

2. An internal combustion engine having a variable volume chamber in which combustion occurs, a spark plug for firing a charge in said chamber, a pair of main intake ports and a pair of main intake passages each communicating with said chamber through a respective of said main intake ports for delivering a charge therethrough, the improvement comprising a pair of auxiliary intake ports and a pair of auxiliary intake passages each communicating with said chamber through a respective of said auxiliary ports, said auxiliary intake passages having an effective cross-sectional area substantially less than the effective cross-sectional area of said main intake passages for causing a given mass flow of charge through said auxiliary intake ports to enter said chamber at a significantly greater velocity, said main and auxiliary intake passages each being symmetric about a centerline passing through said chamber, said spark plug being located substantially on said centerline, said auxiliary intake ports being oriented relative to said chamber and said spark plug for directing the charge entering said chamber through said auxiliary intake ports in a flow path that passes across said spark plug at the time of ignition and valve means for controlling the ratio of communication of said passages with the chamber.

3. An internal combustion engine as set forth in claim 2 wherein the auxiliary passages are disposed to direct the charge flow into the chamber across the chamber, the wall dividing the chamber being oriented relative to the auxiliary intake passages so as to redeflect the flow from the auxiliary intake passages back across the center of the chamber.

4. An internal combustion engine as set forth in claim 3 wherein the flow discharged from one auxiliary intake passage is symmetric about the center line with the flow from the other auxiliary intake passage.

5. An internal combustion engine as set forth in claim 3 wherein the flow from each auxiliary intake passage passes across the center line of the chamber.

6. An internal combustion engine as set forth in claim 2 wherein the auxiliary intake passages and ports are disposed immediately adjacent the center line so that the charge issuing therefrom will pass across the spark plug.

* * * * *